US008630774B2

(12) United States Patent
Holub et al.

(10) Patent No.: US 8,630,774 B2
(45) Date of Patent: Jan. 14, 2014

(54) METHOD AND SYSTEM FOR PREVENTING VEHICLE DAMAGE DURING ROCK CYCLING

(75) Inventors: Patrick Kevin Holub, Novi, MI (US); Steven Yellin Schondorf, Dearborn, MI (US); Bob Bruce Kleve, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 13/273,237

(22) Filed: Oct. 14, 2011

(65) Prior Publication Data

US 2013/0096787 A1 Apr. 18, 2013

(51) Int. Cl.
*G06F 7/00* (2006.01)
(52) U.S. Cl.
USPC ............................................................ 701/51
(58) Field of Classification Search
USPC ................ 701/51, 53, 54, 70, 93, 99, 100, 60
See application file for complete search history.

(56) References Cited

U.S. PATENT DOCUMENTS 5,009,116 A * 4/1991 Ordo et al. ...................... 74/331
2010/0145581 A1* 6/2010 Hou ................................ 701/50

* cited by examiner

*Primary Examiner* — Kim T Nguyen
(74) *Attorney, Agent, or Firm* — Joseph E. Root

(57) ABSTRACT

A method for preventing potential vehicle damage during operation of an automatic rocking control system in an automotive vehicle employing an automatic transmission is described. The method includes monitoring a plurality of actual and derived automatic transmission parameters and comparing the actual values with predetermined limits for the monitored parameters. Upon determining, based on the comparison, that an imminent component vulnerability level exists, the method transmits a warning signal. Further, upon determining, based on the comparison, that an immediate component vulnerability level exists, the method terminates the vehicle rock cycle assist mode. A system for preventing potential vehicle damage is also described.

15 Claims, 3 Drawing Sheets

METHOD AND SYSTEM FOR PREVENTING VEHICLE DAMAGE DURING ROCK CYCLING

BACKGROUND

The present application relates generally to automobile control systems, and more particularly to systems for extricating a stuck vehicle.

The universally recognized and utilized method to free a vehicle stuck in snow or mud consists of setting up a rocking motion by judicious use of the throttle and the range selector mechanism (the shift lever). Initially, a small movement either forward or backward is initiated, followed by a movement in the opposite direction. Acceleration is timed to provide positive feedback to the cyclic movement, until the rocking motion is sufficient to free the vehicle. The harmonic nature of the vehicle response requires instinctive action by the driver to properly time the acceleration bursts. Also, skill is required to avoid over-acceleration, which results in spinning the tires and worsening the situation.

Sometimes, however, rocking the automobile does not succeed in extricating it. One reason for that result is the time required to move the shifter, along with the hydraulic response latency within the transmission. These delays may combine to make the transition time between forward and reverse drive ranges longer than the period of the resonant frequency needed to free the vehicle. Although most contemporary vehicles still have this design limitation, some now incorporate full electronic range control (e-shift), eliminating the direct mechanical connection between the range selector mechanism (traditional shift lever) and the transmission range control mechanism. Full electronic range selector mechanisms provide an electronic range "request" signal to an electronic controller that "authorizes" the request and sends a subsequent electronic signal directly to a range changing solenoid within the transmission or to an electro-mechanical device connected to the transmission range control mechanism to complete the range change. The electronic range selector mechanism allows computer intervention between the driver's movement of the shifter (shift request) and the controller's response—either inhibiting it, retiming it, or automating it in some way. In addition, in at least some of the initial e-shift applications, the potential transitional response between forward and reverse drive ranges is much faster than the manual shifter motion that can be achieved by drivers. By making the increased actuation rates of e-shift possible, full computer aided rock-cycle control using such e-shift hardware can increase vehicle extrication capability by reducing the overall shift time as needed.

Although the rocking method is instinctive and effective, the rapid shifting and often simultaneous application of engine torque can result in severe damage to the transmission if sustained too long, due to rapid heat build-up. Such user behavior is designed and tested for in each automatic transmission design, but the prospective damage makes rocking a highly discouraged behavior by most automobile manufacturers. Moreover, drivers do not receive any obvious indication about the probability of rock cycling effectiveness in a particular situation or how much heat and damage to their transmissions has resulted. This often leads to permanent damage such as burned clutch material and transmission fluid.

Some vehicles are now designed with on-board software that monitors key vehicle sensors, such as throttle, shifter, and wheel movement to identify when a vehicle is being abusively shifted or rock-cycled. Once identified, rock cycle mode controls take over to attempt prevention of vehicle damage from abusive engagements. Initial executions of these actions included only accelerator pedal based clutch pressure increases, but more recent executions include engine torque limits imposed to limit energy supplied to the clutches. The torque limits are implemented with throttle, spark, and fuel control. Often, these torque limits may become so low that it makes rock cycling difficult or essentially impossible.

Therefore, a need exists to implement automatic methods and systems for extricating a stuck vehicle while minimizing risk of damage to the vehicle.

SUMMARY

One embodiment of the present disclosure describes a method for preventing potential vehicle damage during operation of an automatic rocking control system in an automotive vehicle employing an automatic transmission. The method includes monitoring a plurality of automatic transmission parameters and comparing the actual values and predetermined limits for the monitored parameters. Upon determining, based on the comparison, that an imminent component vulnerability level exists, the method transmits a warning signal. Further, upon determining, based on the comparison, that an immediate component vulnerability level exists, the method terminates the vehicle rock cycle assist mode.

Another embodiment of the present disclosure describes a system for preventing potential vehicle damage during operation of an automatic rocking control system in an automotive vehicle employing an automatic transmission. The system includes a monitoring module to monitor a plurality of automatic transmission parameters. Further, a damage prevention module compares the actual values and predetermined limits for the monitored parameters, transmits a warning signal, upon determining, based on the comparison that an imminent component vulnerability level exists; and terminates the vehicle rock cycle assist mode, upon determining, based on the comparison, that an immediate component vulnerability level exists.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

DESCRIPTION OF EXEMPLARY EMBODIMENTS

The present disclosure describes systems and methods for preventing potential vehicle damage (such as transmission damage) during operation of a rocking control system in an automotive vehicle employing an automatic transmission. The method includes monitoring a plurality of automatic transmission parameters calculating the transmitted and lost [converted to heat] energy, deriving the associated net transmission component temperature increases and rate of increase, and comparing those calculated/derived values with predetermined limits for them. Upon determining, based on the comparison, that an imminent component vulnerability level exists, the method transmits a warning signal. Further, upon determining, based on the comparison, that an immediate component vulnerability level exists, the method terminates the vehicle rock cycle assist mode.

Figure 1:
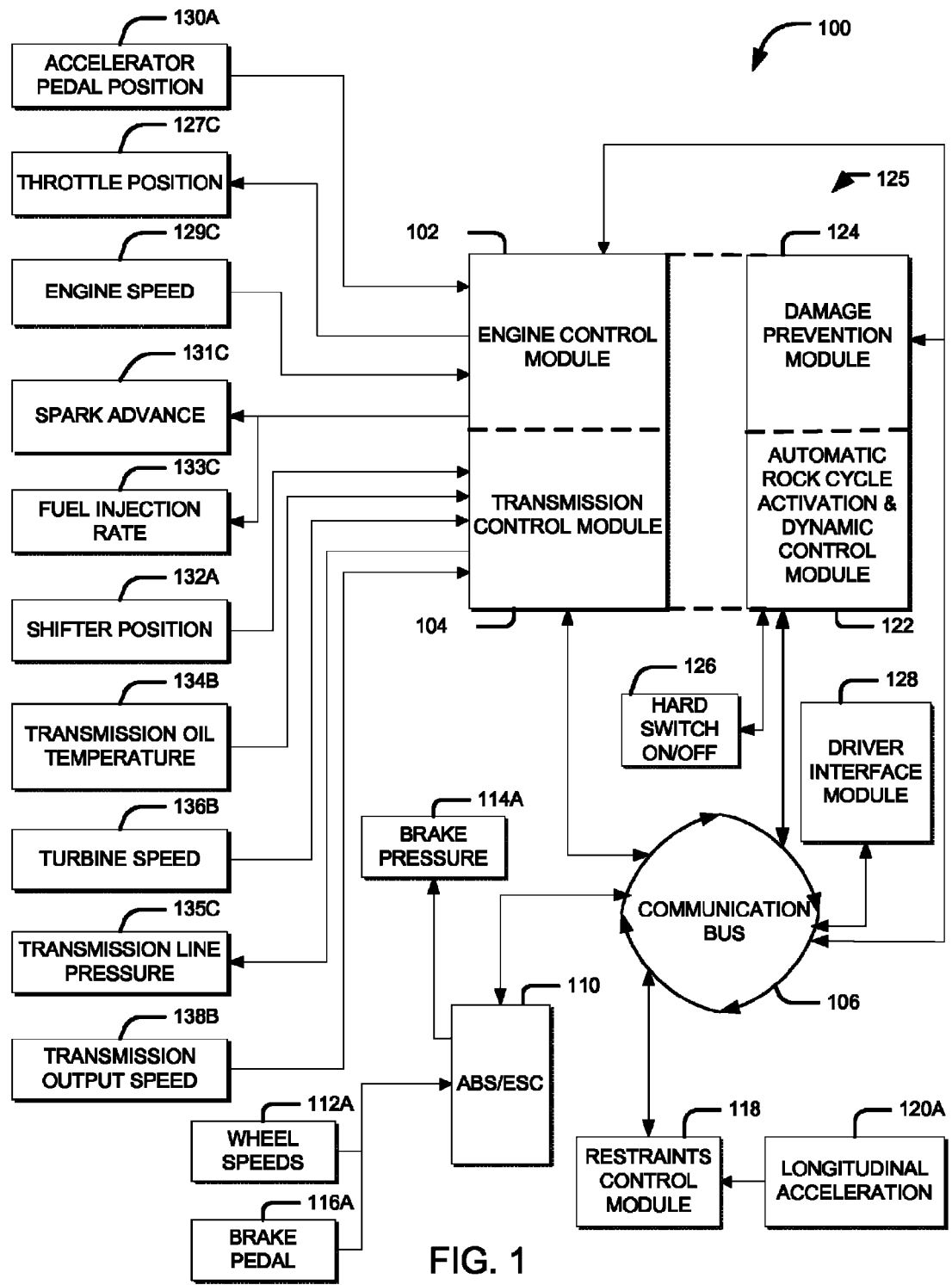
FIG. 1 depicts an exemplary system for preventing potential vehicle damage during operation of an automatic rocking control system in an automotive vehicle employing an automatic transmission.

FIG. 1 depicts an exemplary system 100 for preventing potential vehicle damage during operation of an automatic rocking control system in an automotive vehicle employing an automatic transmission. This system can warn against and prevent damage to vehicle components.

The system 100 includes an engine control module 102 and a transmission control module 104. Those elements monitor and provide all needed engine and transmission parameter data via an internal communication bus 106 (for example, a controller area network bus).

The system 100 includes a rock cycle and damage prevention module 125, which further includes a damage prevention module 124 and an automatic rock cycle activation & dynamic control module 122. It will be understood that all reference numbers in FIG. 1 with suffix "A" represent parameters related to the automatic rock cycle activation & dynamic control module 122; all reference numbers in FIG. 1 with suffix "B" represent parameters related to the damage prevention module 124; and all reference numbers in FIG. 1 with suffix "C" represent parameters related to the rock cycle and damage prevention module 125.

The activation and dynamic control module 122 first determines whether the vehicle is stuck and whether rock cycle assist mode is required. That determination can be based on, for example, a comparison of individual wheel motions and the frequency/duration of repeated forward-reverse-forward shifts with predetermined values. Once determined, the activation & dynamic control module 122 will automatically assist the driver in dynamic vehicle rocking motion control up to the point where further positive progress ceases or the damage prevention module 124 signals for these actions to be terminated. Then the determination of the appropriate damage mitigating action to be taken is made and communicated to the control modules 122, 104, and 102, if they are separate.

The activation & dynamic control module 122 may detect the vehicle being stuck in a variety of ways, including input from the driver by, for example, activating an automated detection system that compares actual vehicle motion to wheel motion, resulting in a "vehicle stuck" finding when the vehicle is unable to move despite continuous movement of the wheels.

It should be understood that the system 100 includes control module inputs, which are direct measurement data, and outputs, which are parametric controls that are used to initiate, assist, or terminate & inhibit rock cycle behavior, and whose values are additional input data to the damage prevention module 124.

The control module inputs include various parameters monitored by the automatic rock cycle activation & dynamic control module 124. The parameters may include, without limitation, accelerator pedal position 130A, and shifter position 132A. Other parameter data may be gathered from an Antilock Braking System/Electronic Stability Control Module (ABS/ESC) 110, which takes into account speeds of all four wheels 112A, brake pressure applied on all four wheels 114A, and brake pedal activation status 116A. Moreover, a restraints control module 118, which considers longitudinal acceleration 120A, may also provide inputs. Further, the damage prevention module 124 accepts inputs including transmission oil temperature 134B, turbine speed 136B, and transmission output speed 138B.

The rock cycle and damage prevention module 125 accepts engine speed 129C as input. The outputs from the rock cycle and damage prevention module 125 include throttle position 127C, spark advance 131C, fuel injection rate 133C, and transmission line pressure 135C.

The parameter data, which is not gathered by the control modules 102 and 104 directly, can be communicated to the control modules 102 and 104 through the communication bus 106. In general, several parameters may be monitored, although only a few may be employed for damage control. Two or more of the modules 102, 104, 122, and 124 may be separate or integrated, based on architectural preferences.

The damage prevention module 124 may then utilize the monitored parameter values to predict or derive values of other parameters, such as estimated component temperature changes. These predicted parameters are then compared with predetermined limits. For example, the damage prevention module 124 can use the monitored parameter values to continuously predict the net energy gain, estimated temperature change, and estimated resultant temperature of one or more transmission components and compare these predicted values with predetermined limits for the predicted parameters. Other predicted parameters can include, without limitation by way of example, component temperature, cumulative time at temperature, and rate of temperature change.

Upon determining, based on this comparison that imminent component vulnerability exists with relation to a vehicle component, the damage prevention module 124 transmits a warning signal to the driver interface module 128. Alternatively, if the component vulnerability level continues to increase and reaches an immediate component vulnerability level, damage prevention by energy management control is invoked, which may be performed through for example, clutch pressure and engine torque and speed control intervention, up to and including exit from the automated rocking control strategy.

The activation & dynamic control module 122 may employ one of the rock cycle detection algorithms known in the art. In one implementation, the activation & dynamic control module 122 determines, through one of several algorithms known in the art, that the driver is rock cycling manually (via the shifter, throttle, and brake) and induces the activation & dynamic control module 122 to trigger the vehicle rock cycle assist mode. In alternative implementations, the activation may be performed through a hardware switch 126 activated by the driver. The switch 126 may be implemented as a button or a lever, or through a driver interface 128 having a display such as a touch screen display device or a keypad for input. Once the vehicle rock cycle assist mode has been triggered, the vehicle undergoes automatic rock cycling. The driver interface 128 may inform the driver of the initiation of automated rock cycling before triggering the vehicle rock cycle assist mode. The activation & dynamic control module 122 may even wait for the drivers approval, through voice command, for example, before triggering the vehicle rock cycle assist mode.

The algorithms in damage prevention module 124 mentioned above can include energy modeling for prediction of clutch element, torque converter, and fluid temperatures and associated damage prevention by energy management control, via torque and speed control intervention, up to and including exit from the vehicle rock cycle assist mode. For example, a torque converter temperature predictor and/or an energy predictor for the transmission clutches may be included along with the associated predetermined limits.

Some examples of energy monitoring and clutch damage control algorithms are discussed below. One algorithm involves detecting an abusive rocking maneuver and temporarily limiting the engine speed to a predetermined value on each transition from neutral to the forward or reverse ranges. The algorithm then superimposes continuous engine speed and torque limitations to prevent clutch damage. Another clutch damage prevention strategy involves predicting clutch temperature and determining whether the calculated temperature equals or exceeds a reference clutch temperature. Clutch temperature increases are proportional to the work done to them during shifts [i.e. f(transmission line pressure, angle of clutch slip). Increasing transmission line pressure serves to inhibit clutch damage by significantly reducing the time and angle of clutch slip during shifts and thereby decreasing the subsequent rate of heat energy absorbed (power) by the clutch—but at the expense of shift feel during such maneuvers. The comparison of the power absorbed by a clutch and its heat dissipation rate into the transmission fluid determines its net temperature rise and rise rate and aids in predicting when failure limits would be reached so mitigating actions can be employed to prevent them.

Another example could include monitoring and controlling transmission fluid temperature. High fluid temperature at the outlet port of the torque converter can cause fluid breakdown and clutch overheating due to insufficiently low cooling or lubricant flow temperature. A control strategy uses inferred torque converter outlet port temperature in executing a torque truncation strategy for the engine, if the inferred temperature reaches a threshold value. The torque truncation then can be terminated after the transmission fluid temperature falls below a temperature threshold.

The driver interface module 128 displays warning signals transmitted by the damage prevention module 124, based on the determining that imminent component vulnerability exists. The warning may be delivered through visual or audio aids, such as a display system or an audible warning system. The hardware switch 126 is designed to activate the vehicle rock cycle assist mode manually.

The imminent component vulnerability level may be defined as a level approaching the immediate component vulnerability level. In one implementation, the imminent component vulnerability level may be defined as a percentage of the immediate component vulnerability level.

Figure 2:
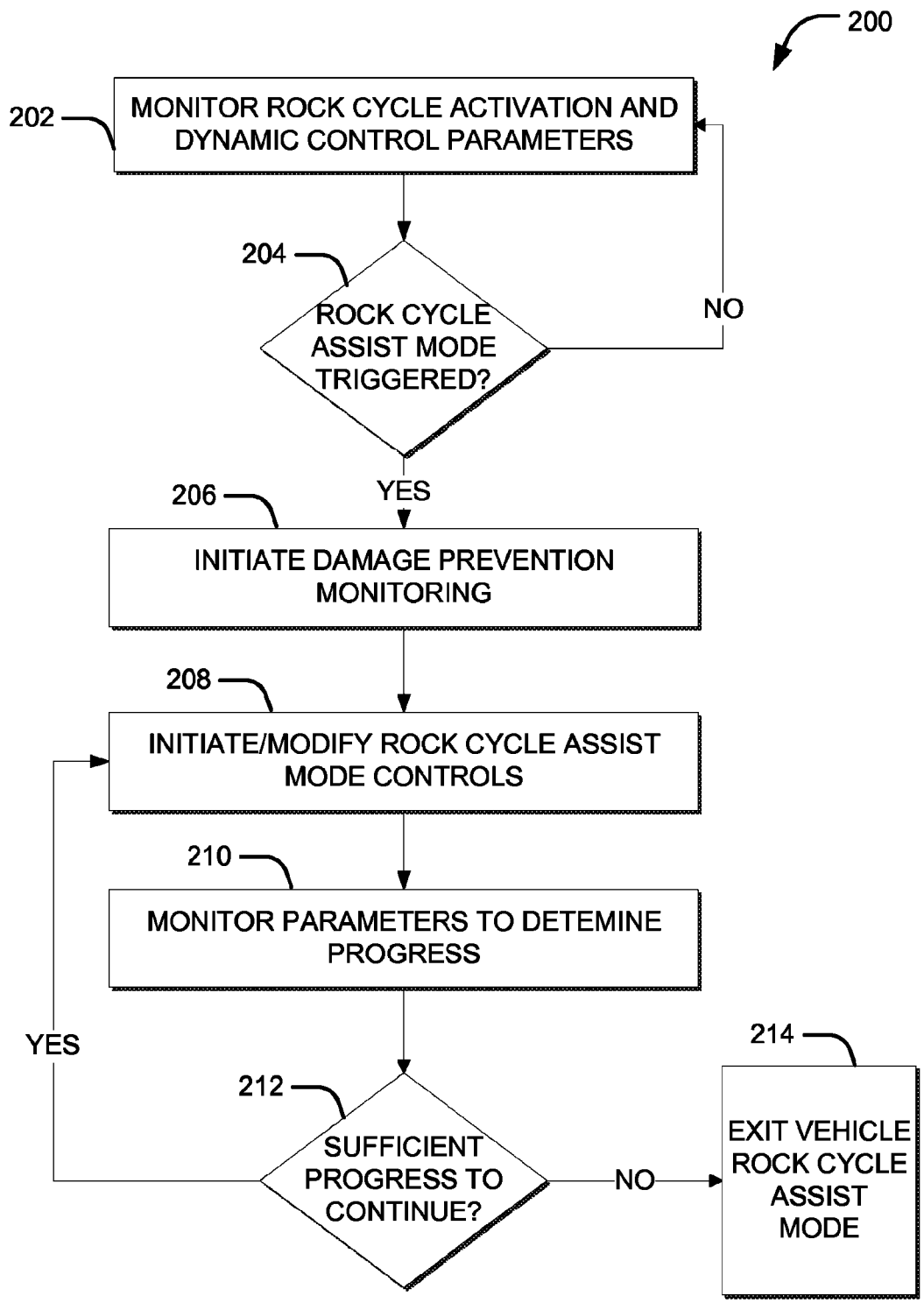
FIG. 2 illustrates an exemplary embodiment of a method, which executes within the automatic rock cycle activation & dynamic control module of FIG. 1.

FIG. 2 illustrates an exemplary embodiment of a method 200, which executes within the automatic rock cycle activation & dynamic control module 122. At step 202, the method 200 monitors the rock cycle activation & dynamic control 122 parameters (parameters having "A" as reference numeral suffix) as well as other parameters related to the rock cycle and damage prevention module 125 (parameters having "C" as reference numeral suffix).

As already described in relation with FIG. 1, the system 100 triggers a vehicle rock cycle assist mode based on a determination that the vehicle is stuck or the rock cycle assist mode is required. The determination can be based on, for example, the comparison of individual wheel motions and the frequency/duration of repeated forward-reverse-forward shifts with predetermined values. Until the rock cycle assist mode is triggered (step 204), the method 200 continues to monitor the parameters at step 202.

Once the rock cycle assist mode is triggered (step 204), the method 200 initiates damage prevention at step 206 and will be described in more detail with relation to FIG. 3; alternatively, the damage prevention may be initiated before the rock cycle assist mode is triggered. At step 208, the method 200 initiates automatic rock cycle assist mode controls known in the art, such as those previously disclosed in U.S. Pat. No. 7,302,333, the disclosure of which is expressly incorporated herein by reference. The method 200 continues to monitor the parameters to determine progress at step 210, and if the vehicle is determined to be making sufficient progress in the rock cycle assist mode at step 212, then the rock cycle assist mode controls are continued and modified as necessary. If not, the method 200 exits the rock cycle assist mode at step 214.

Figure 3:
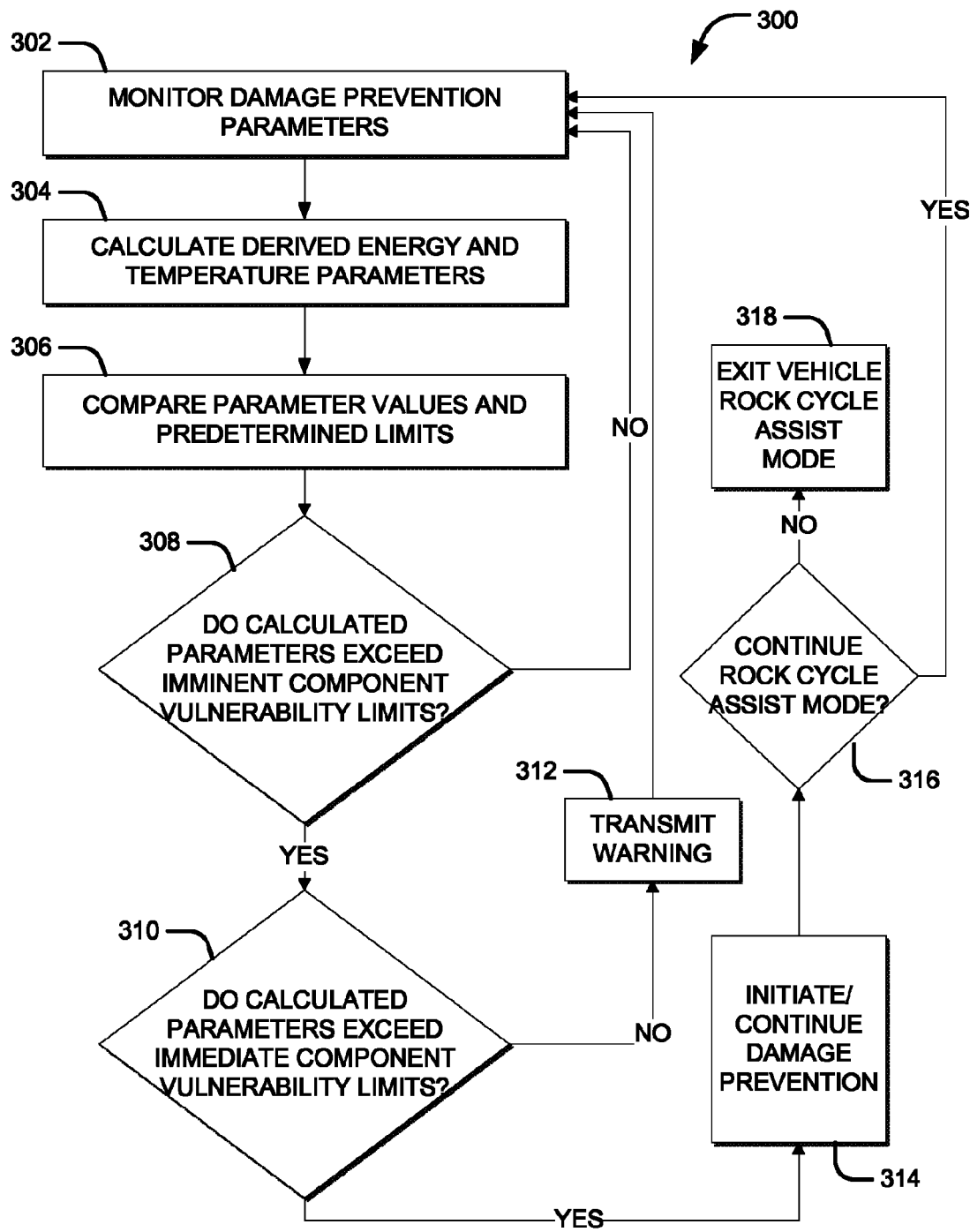
FIG. 3 illustrates an exemplary embodiment of a method, which executes within the damage prevention module of FIG. 1.

FIG. 3 illustrates an exemplary embodiment of a method 300, which executes within the damage prevention module 124. The method 300 prevents potential vehicle damage during operation of a rocking control system in an automotive vehicle employing an automatic transmission.

At step 302, the method 300 monitors the damage prevention 122 parameters (parameters having as reference numeral suffix) as well as other parameters related to the rock cycle and damage prevention module 125 (parameters having "C" as reference numeral suffix).

At step 304, the monitored parameter values are utilized to predict or derive values of other parameters, such as the estimated energy and temperature changes. These derived parameters are then compared with predetermined limits at step 306. For example, the damage prevention module 124 can use the monitored parameter values to continuously predict the net energy gain, estimated temperature change, and estimated resultant temperature of one or more transmission components and compare these predicted values with predetermined limits for the predicted parameters, such limits on temperature, cumulative time at temperature, and rate of temperature change.

Upon determining (step 308), based on this comparison, that an imminent component vulnerability exists, the method 300 proceeds to step 310 and transmits a warning signal at step 312; otherwise, the method 200 returns to step 302. Further, if at step 310, the method 300 determines, based on the comparison, that an immediate component vulnerability exists, damage prevention by energy management control is initiated at step 314, which may be performed through for example, clutch pressure and engine torque and speed control intervention. At step 316 of method 300, the difference in component temperatures and their limits are evaluated together with the rate of temperature increase to determine whether the rock cycle assist mode should be continued at step 302. If not, the method 300 exits the rock cycle assist mode, at step 318.

It will be understood that although the steps of the methods 200 and 300 are recited in a certain order, the order may be altered and certain steps may be replaced with variants or alternatives without affecting the purpose or scope of the claimed invention. The same is true for all the other methods described in the present disclosure.

It will be apparent to those in the art that the methods discussed in relation with FIGS. 2 and 3 are exemplary in nature, and different automatic rock cycling modes, which have energy limit constraints and prevent vehicle damage, can be designed for vehicles with varying components and capabilities, without departing from the scope or purpose of this disclosure.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

What is claimed is:

1. A method for preventing potential vehicle damage during operation of an automatic rocking control system in an automotive vehicle employing an automatic transmission, the method comprising:
    monitoring a plurality of automatic transmission parameters;
    comparing factual values and predetermined limits for the monitored parameters;
    transmitting a warning signal, upon determining, based on the comparison, that an imminent component vulnerability level exists; and
    terminating a vehicle rock cycle assist mode, upon determining, based on the comparison, that an immediate component vulnerability level exists.

2. The method of claim 1, further comprising the steps of:
    triggering the vehicle rock cycle assist mode, based on a determination that the vehicle is stuck;
    initiating vehicle rock cycle assist mode controls;
    monitoring the parameters to determine vehicle progress;
    upon the determination that the vehicle is making sufficient progress, modifying the vehicle rock cycle assist mode controls accordingly; and
    otherwise, terminating the vehicle rock cycle assist mode.

3. The method of claim 1, wherein the parameters further include one or more of:
    engine speed;
    transmission turbine speed;
    transmission oil temperature;
    transmission line pressure;
    transmission output speed;
    accelerator pedal position;
    throttle position;
    engine speed;
    spark advance;
    fuel injection rate;
    shifter position;
    characterized engine torque; or
    characterized torque converter efficiency.

4. The method of claim 3, wherein the derived parameters include:
    component temperature;
    net energy gain;
    estimated temperature change;
    estimated resultant temperature of one or more transmission components;
    cumulative time at temperature; or
    rate of temperature change.

5. The method of claim 1, wherein the monitored parameters include certain derived parameters, derived from other parameters.

6. The method of claim 1, wherein the imminent component vulnerability level is defined as a percentage of the immediate component vulnerability level.

7. The method of claim 1, wherein the warning signal is one or more of:
    a visual signal; or
    an audible signal.

8. A system for preventing potential vehicle damage during operation of an automatic rocking control system in an automotive vehicle employing an automatic transmission, the system comprising:
    a monitoring module configured to monitor a plurality of automatic transmission parameters; and
    a damage prevention module configured to:
        compare actual values and predetermined limits for the monitored parameters;
        transmit a warning signal, upon determining, based on the comparison, that an imminent component vulnerability level exists; and
        terminate a vehicle rock cycle assist mode, upon determining, based on the comparison, that an immediate component vulnerability level exists.

9. The system of claim 8 further comprising an automatic rock cycle activation and dynamic control module configured to:
    trigger the vehicle rock cycle assist mode, based on a determination that the vehicle is stuck;
    initiate the functioning of the damage prevention module;
    initiate vehicle rock cycle assist mode controls;
    monitor the parameters to determine vehicle progress;
    upon the determination that the vehicle is making sufficient progress, modify the vehicle rock cycle assist mode controls accordingly; and
    otherwise, terminate the vehicle rock cycle assist mode.

10. The system of claim 9, wherein the triggering of the vehicle rock cycle assist mode is performed by a hardware switch.

11. The system of claim 8, wherein the parameters further include one or more of:
    engine speed;
    transmission turbine speed;
    transmission oil temperature;
    transmission line pressure;
    transmission output speed;
    accelerator pedal position;
    throttle position;
    engine speed;
    spark advance;
    fuel injection rate;
    shifter position;
    characterized engine torque; or
    characterized torque converter efficiency.

12. The system of claim 8, wherein the monitored parameters include certain derived parameters, derived from other parameters.

13. The system of claim 12, wherein the derived parameters include:
    component temperature;
    net energy gain;
    estimated temperature change;
    estimated resultant temperature of one or more transmission components;
    cumulative time at temperature; or
    rate of temperature change.

14. The system of claim 8, wherein the imminent component vulnerability level is defined as a percentage of the immediate component vulnerability level.

15. The system of claim 8, wherein the warning signal is one or more of:
 a visual signal; or
 an audible signal.

* * * * *